United States Patent [19]

Moffatt et al.

[11] Patent Number: 4,592,232

[45] Date of Patent: Jun. 3, 1986

[54] ANGULAR VELOCITY SENSOR

[75] Inventors: E. Marston Moffatt, Glastonbury; Richard E. Swarts, Simsbury, both of Conn.

[73] Assignee: United Technologies Corporation, Hartford, Conn.

[21] Appl. No.: 608,001

[22] Filed: May 7, 1984

[51] Int. Cl.[4] .................................................. G01P 3/26
[52] U.S. Cl. .................................. 73/505; 73/516 LM
[58] Field of Search ............. 73/505, 516 R, 516 LM, 73/204; 338/25, 28, 36, 318

[56] References Cited

U.S. PATENT DOCUMENTS

| 3,110,185 | 11/1963 | Hughes | 73/517 |
| 3,205,715 | 9/1965 | Meek | 73/505 |
| 3,500,691 | 3/1970 | Moore | 73/516 |
| 4,020,700 | 5/1977 | Lopiccolo et al. | 73/516 |
| 4,026,159 | 5/1977 | Isakson et al. | 73/516 LM |

FOREIGN PATENT DOCUMENTS 2241922  3/1974  Fed. Rep. of Germany .

OTHER PUBLICATIONS

Heated Sensor Finds Wide Applications in Fluid Flow Measurements, a publication of CGS/Datametrics, Bulletin 600, pp. 13–19.

Primary Examiner—Stewart J. Levy
Assistant Examiner—John E. Chapman, Jr.
Attorney, Agent, or Firm—Francis J. Maguire, Jr.

[57] ABSTRACT

The present invention relates to a sensor for sensing orthogonal components of angular velocity of rotation of the sensor about any axis in a plane perpendicular to a reference jet axis within the sensor, wherein a fluid jet is deflected relative to two pairs of electrically resistive, temperature sensitive elements in response to rotation of the sensor, wherein each pair of elements forms the sensing branch of a bridge circuit, the jet deflection causing differential cooling and bridge unbalance which is an indication of the deflection of the fluid jet from the reference jet axis which is in turn an indication of the rate and direction of angular rotation, wherein each pair of elements is disposed in a plane perpendicular to the reference jet axis, each pair sensing an orthogonal component of angular velocity of rotation.

1 Claim, 7 Drawing Figures

FIG. IA
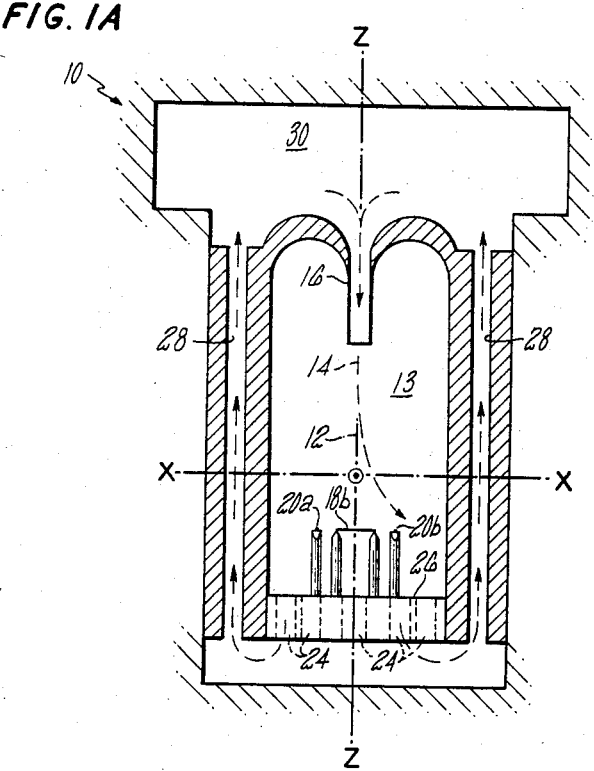
FIG. IB
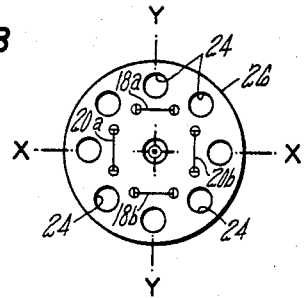

ANGULAR VELOCITY SENSOR

DESCRIPTION

1. Technical Field

This invention relates to angular velocity sensors, and more particularly to angular velocity sensors having sensing elements cooled differentially by a fluid jet in the presence of sensor rotation.

2. Background Art

Fluid jet angular velocity sensors utilizing sensing elements in a "plane of sensitivity" for sensing the speed of rotation are well known in the art. U.S. Pat. No. 3,500,690 to Schuemann, U.S. Pat. No. 4,020,700 to Lopiccolo et al, and U.S. Pat. No. 3,581,578 to Schuemann, all disclose fluid jet angular velocity sensors having a single pair of sensing elements for sensing the speed of rotation about an axis perpendicular to the plane of sensitivity.

The sensing elements are usually positioned symmetrically about a reference jet axis with each element on opposite sides and at equal distances therefrom. A fluid jet is directed along the reference jet axis from a nozzle which cools the sensing elements in equal proportions in the absence of sensor rotation. Due to the well-known Coriolis effect, the fluid jet impinges nonsymmetrically, i.e., the fluid jet "bends" in the presence of sensor rotation. Because of the well-known characteristic of fluid jets in which the higher velocity fluid particles are concentrated at the center of the jet and the lower velocity particles around its periphery, the sensing elements are cooled in different proportions whenever the fluid jet impinges nonsymmetrically upon the sensing elements.

DISCLOSURE OF INVENTION

The object of the present invention is to provide an angular velocity sensor that more accurately senses the angular velocity of rotation about any rotation axis in any plane perpendicular to a reference jet axis.

According to a first aspect of the present invention, an angular velocity sensor includes a nozzle mounted at one end of a jet chamber within a cylindrical housing, a pump for delivering fluid under pressure to the nozzle which provides a fluid jet along a reference jet axis along the center of the cylinder, two pairs of electrically resistive, temperature sensitive sensing elements mounted in a plane perpendicular to the reference jet axis, wherein each pair is part of an associated bridge circuit which heats the elements, each pair has its elements disposed opposite one another on either side of the reference jet axis, each pair is disposed on a corresponding one of a pair of orthogonal axes lying in said plane, each pair senses an orthogonal component of the sensor's rotation about a rotation axis perpendicular to the reference jet axis, the sensing elements of each pair being cooled differentially in response to deflection of the fluid jet from the reference jet axis in the presence of sensor rotation thereby unbalancing the bridge and causing a voltage change measured at its midpoint, said voltage being an indication of the deflection of the fluid jet from the reference jet axis which is in turn an indication of the rate and direction of angular rotation of the sensor about the axis of rotation.

According to a second aspect of the present invention, each sensing element is mounted on a pair of conductive posts, each post having a chisel tip having a narrow edge for accurately mounting a wire sensing element having a precise length.

The angular velocity sensor of the present invention permits the more accurate sensing of angular velocity about any axis in any plane parallel to the reference jet axis by introducing an additional pair of sensing elements, each mounted on chisel tipped posts, and oriented so as to sense the component of Other features and advantages will be apparent from the specification and claims and from the accompanying drawings which illustrate an embodiment of the invention.

BRIEF DESCRIPTION OF THE DRAWINGS

FIG. 1A is a simplified plan and sectional illustration, not to scale, of an angular velocity sensor according to the present invention;

FIG. 1B is a simplified plan view illustration of the plug of FIG. 1A.

BEST MODE FOR CARRYING OUT THE INVENTION

Figure 2:
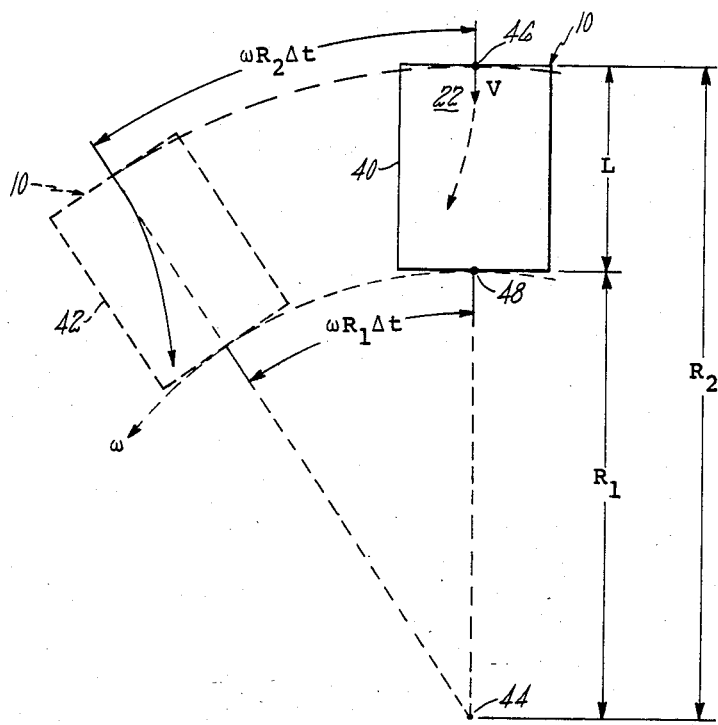
FIG. 2 is an illustration of a sensor undergoing rotation.

Referring to FIGS. 1A and 1B, a plan and section view of the present invention as may be used in an angular velocity sensor of the type disclosed in U.S. Pat. No. 3,500,690 granted to Schuemann and assigned to the assignee hereof is shown. The sensor 10 is illustrated having a reference jet axis 12 which is coincident with the z-axis of a three dimensional x-y-z rectangular coordinate system having its origin in the sensor's central chamber 13 as shown. A jet stream of fluid 14 is provided through a nozzle 16 which is directed toward two pairs of sensing elements 18a, 18b, 20a, 20b, each pair of which forms the sensing branch of separate bridge circuits (not shown). Once the jet stream has passed by the sensing elements the fluid exits the central chamber 13 through passageways 24 in a plug 26 at one end of the chamber 13. The fluid is then forced through side passageways 28 into a fluid delivery mechanism or pump (not shown) at the base end 30 of the sensor. The fluid is then pumped into the nozzle 16 where it again is forced as a jet stream 14 into the central chamber 13.

The jet stream will impinge on the sensing elements symmetrically in the absence of any rotation of the sensor. However, once the sensor is rotated about any axis lying in any plane parallel to the x-y plane the jet stream will deflect in proportion to the rate of rotation. The jet stream 14 in FIG. 1A is shown deflecting to the right under the influence of sensor rotation about an axis parallel to the y-axis in a clockwise direction. The sensing elements 20a, 20b will thereby be cooled differentially as a result of the deflection of the jet stream. The magnitude of the difference in cooling will be directly proportional to the rotational rate. If an additional component of rotation parallel to the x-axis is introduced, the jet stream will also be deflected so as to cause differential cooling of the elements 18a, 18b. Thus, by determining the magnitudes of the differential cooling effects in the sensing elements the rate of rotation about any axis in a plane parallel to the x-y plane can be readily determined.

For example, in FIG. 2 a sensor 10 is illustrated in two successive positions 40,42 in its rotation about an axis 44 perpendicular to the plane of the drawing. The distance $R_2$ from the rotation axis 44 to the point of entry 46 of the jet stream into the central chamber 22, the distance $R_1$ from the rotation axis 44 to a point 48 lying in a plane coincident with the sensing elements 18A, 18B, 20A, 20B, and the length L traversed by the jet stream from the nozzle opening to the sensing elements are all shown in FIG. 2. The average jet velocity V and the rotation rate $\omega$ are also indicated in FIG. 2. The time of flight ($\Delta t$) of a fluid particle is as follows:

$$\Delta t = \frac{L}{V}.$$

The distance traveled by the entry point 46 is equal to $\omega R_2 \Delta t$ as shown. The distance traveled by the sensing point 48 is equal to $\omega R_1 \Delta t$ as shown. Therefore, since the fluid particle will continue to travel in a straight line while the sensor changes its position, the jet deflection at the sensing elements will be equal to $\omega(R_2 - R_1)\Delta t$. But, $(R_2 - R_1) = L$, so that:

$$\text{Jet Deflection} = \omega L \left( \frac{L}{V} \right) = \frac{\omega L^2}{V}.$$

Thus, it is seen that the deflection of the jet stream is easily translated into the corresponding speed of rotation about the axis of interest.

Figure 3:
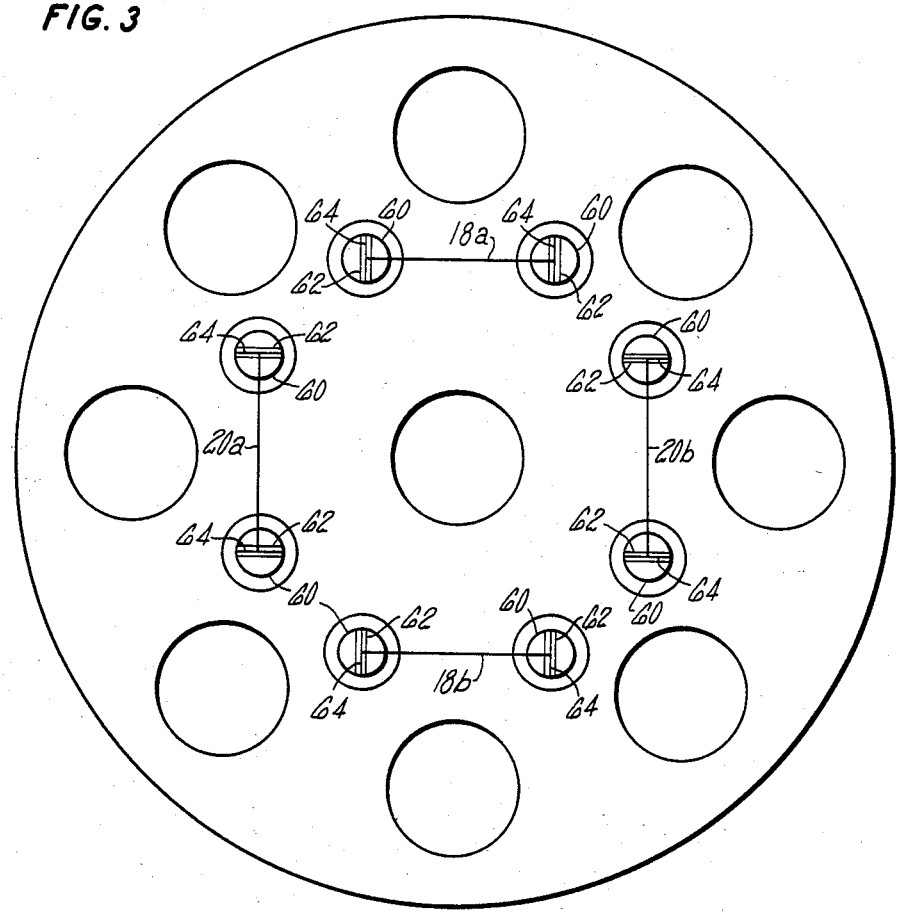
FIG. 3 is an enlarged plan view of the sensor plug of FIG. 1B, showing the two pairs of sensing elements in more detail.

Referring now to FIG. 3, which is an enlarged plan view of the plug of FIG. 1B, the sensing elements 18a, 18b, 20a, 20b are shown. Each element is shown as a straight line illustrating a short length of tungsten wire. Each wire must be the same length in order to provide the desired accuracy in resistance values. Each wire is mounted at each end on a conductive post 60. Each post has a sharp chisel tip 62 which provides a very narrow edge 64 for wire attachment; by positioning the posts 60 very accurately, and by cutting sensing element wires 18a, 18b, 20a, 20b to a correspondingly accurate length, the resistances of all of the sensing elements are then replicated very accurately. It should be understood that the wires could be composed of a material other than tungsten having similar properties. It should also be understood that the sharp chisel tip 62 need not be chisel shaped, but could as easily have an arbitrarily shaped plateau of small size for mounting the wire.

Figure 4:
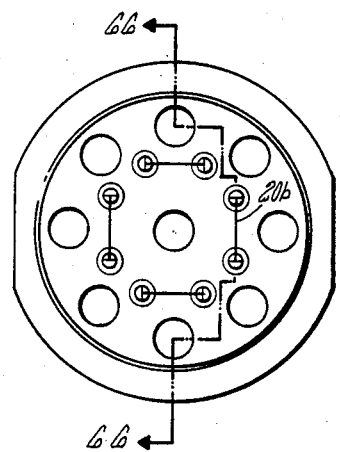
FIG. 4 is another simplified plan view illustration of the sensor plug of FIG. 1.
Figure 5:
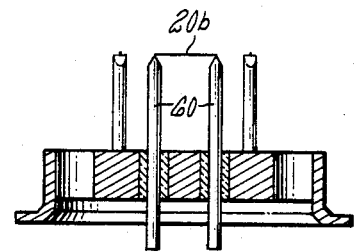
FIG. 5 is a simplified sectional illustration of the sensor of FIG. 4 viewed along lines 66.
Figure 6:
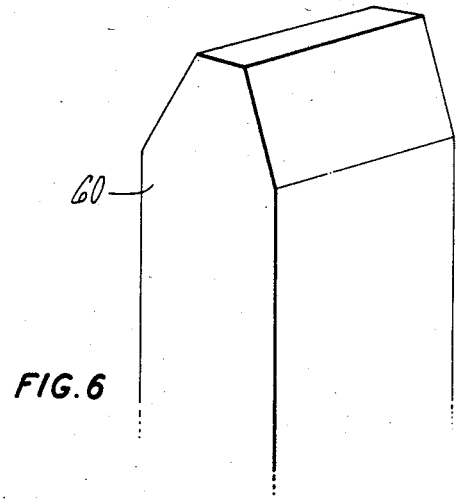
FIG. 6 is a simplified perspective illustration, not to scale, of a typical conductive post for mounting one end of a sensing element.

A side view of a sensing element 20b is shown in FIG. 5, which is a section view along the dashed line 66 of FIG. 4. The posts 60 shown in FIG. 5 are conductors which permit the connection of the sensing element 20b into an electric circuit which determines the resistance, and hence the amount of cooling received by the sensing element. Another view of a post 60 is shown in FIG. 6.

Each pair of sensing elements is wired into individual bridge circuits in which the sensing elements are electrically heated to a temperature at which the resistance of the sensing elements, which vary directly with temperature, effect a balance or equilibrium in the bridge circuit. The electrical power required to maintain the sensing elements at their equilibrium temperature is a function of the cooling imposed on the sensing elements, which is itself a function of the degree to which the fluid jet deviates from the reference jet axis. The deflection of the jet from a centered condition relative to the sensing elements is in turn a function of the angular movement imposed upon the unit so that the power consumption thus provides an indication of the rate and the direction of the angular movement. Each of the pairs of sensing elements is thus provided with a circuit similar to that described in U.S. Pat. No. 3,597,676 to Moore, U.S. Pat. No. 4,020,699 to Schaffer, U.S. Pat. No. 4,026,159 to Isakson, U.S. Pat. No. 3,587,328 to Schuemann or any such similar circuit for comparing the values of two resistances and providing an output signal in proportion to the difference therebetween. It must be emphasized that although each of the above named U.S. patents hereby incorporated by reference herein discloses a circuit having a pair of bridge circuits, one for each sensing element, the present invention utilizes one of these typical circuits for one pair of sensing elements and a completely distinct (although it may be of exactly the same type circuit) for the other pair of sensing elements. In this way, the separate output signals from each of these circuits, indicative of the separate angular velocity components about the x-and y-axes, are provided separately.

Although the various aspects of the present invention have been shown and described with respect to preferred embodiments thereof, it should be understood by those skilled in the art that the foregoing and various other changes, additions and omissions may be made therein and thereto, without departing from the spirit and scope of the invention.

Having thus described exemplary embodiments of our invention, that which we claim as new and desire to secure by Letters Patent is:

1. Angular velocity sensor means, comprising:
   housing means, for enclosing a jet chamber having a reference jet axis and having nozzle means disposed at one end of said chamber for discharging a fluid jet along said reference jet axis;
   fluid delivery means, for delivering a fluid under pressure to said nozzle to form said fluid jet;
   sensor means, having first and second pairs of wire sensing elements disposed symmetrically, at an opposite end of said chamber, about said reference jet axis in a first plane perpendicular thereto, said first and second pairs positioned on first orthogonal axes of said first plane, said sensing elements of each pair being cooled differentially, in response to deflection of said fluid jet from said reference jet axis in the presence of sensor rotation about a rotaion axis lying in a second plane parallel to said first plane, in proportion to anglar velocity components of said sensor rotation resolved about second orthogonal axes lying in said second plane, each of said second orthogonal axes being parallel to a corresponding one of said first orthogonal axes, each of said wire sensing elements having resistance values which vary according to the amount of cooling received by each, each mounted across an associated pair of posts such that each mounted wire sensing element is parallel to the other wire element in its associated pair, said posts having sharp chisel shaped tips for mounting an exact length of wire between each associated pair of posts; and
   detector circuit means, responsive to said sensing elements' resistance values for providing signals indicative to said angular velocity components of said sensor's velocity of rotation resolved about said component axes.

* * * * *

UNITED STATES PATENT AND TRADEMARK OFFICE
CERTIFICATE OF CORRECTION

PATENT NO. : 4,592,232

DATED : June 3, 1986

INVENTOR(S) : E. MARSTON MOFFATT et al

It is certified that error appears in the above-identified patent and that said Letters Patent is hereby corrected as shown below:

Column 2, line 8.   After "of" insert -- rotation orthogonal to the components sensed by the other sensing elements. --

Column 2, line 15.  Cancel "plan and"

Column 2, line 28.  After "sensor" insert -- plug --

Column 3, line 38.  After "view of the" insert -- sensor --

Column 4, line 51.  Cancel "aion" and substitute therefor -- ation --

Column 4, line 52.  Cancel "anglar" and substitute therefor -- angular --

Signed and Sealed this
Fourteenth Day of October, 1986

[SEAL]

Attest:

DONALD J. QUIGG

Attesting Officer

Commissioner of Patents and Trademarks